United States Patent [19]

Pospischil

[11] Patent Number: 4,744,104
[45] Date of Patent: * May 10, 1988

[54] SELF-SYNCHRONIZING SCRAMBLER

[75] Inventor: Reginhard Pospischil, Graefelfing, Fed. Rep. of Germany

[73] Assignee: Siemens Aktiengesellschaft, Berlin and Munich, Fed. Rep. of Germany

[*] Notice: The portion of the term of this patent subsequent to May 5, 2004 has been disclaimed.

[21] Appl. No.: 739,700

[22] Filed: May 31, 1985

[30] Foreign Application Priority Data

Jun. 4, 1984 [DE] Fed. Rep. of Germany ....... 3420801

[51] Int. Cl.$^4$ .............................. H04L 9/00
[52] U.S. Cl. ......................... 380/44; 380/50
[58] Field of Search ............... 178/22.14, 22.17, 22.19; 380/44, 48, 50

[56] References Cited

FOREIGN PATENT DOCUMENTS 1591805  6/1981  United Kingdom .

OTHER PUBLICATIONS

"Parallel Arbeitende Scrambler, Descrambler und Zufallsfolgen-Generation", Electronik Arbeitsblatt Nr. 163, pp. 67-70 12/30/83.

*Primary Examiner*—Salvatore Cangialosi
*Assistant Examiner*—Aaron J. Lewis
*Attorney, Agent, or Firm*—Hill, Van Santen, Steadman & Simpson

[57] ABSTRACT

A self-synchronizing scrambler for high bit rates has a number of scrambler stages supplied in parallel with bits of a signal to be scrambled, each scrambler stage having a series-connected pair of modulo-2 adders, and at least one shift register. A selected number of scrambler stages in the scrambler may include an additional shift register depending upon the number p of parallel bits in the signal to be scrambled, and the total number n of shift registers in the scrambler. The number of scrambler stages having two shift registers is n-p and the number of following scrambler stages having one shift register is 2 p−n. For suppressing short periods, a further modulo-2 adder can be connected between the original two modulo-2 adders, the additional modulo-2 adder inverting at least one bit of the signal for the short periods.

8 Claims, 5 Drawing Sheets

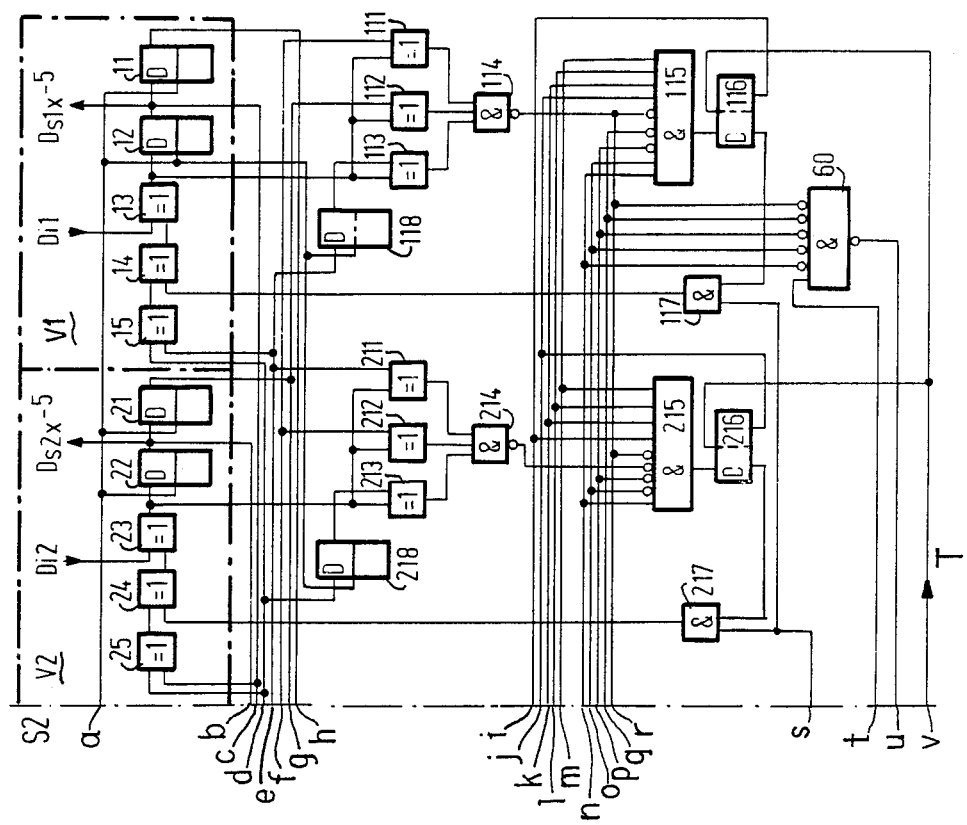

SELF-SYNCHRONIZING SCRAMBLER

BACKGROUND OF THE INVENTION

1. Field of the Invention

The present invention relates to a scrambler for a digital signal, and in particular to a self-synchronizing scrambler having a number of scrambler stages to which the digital signal bits are supplied in parallel.

2. Related Application and Patent

The subject matter of the present application is related to the subject matter of co-pending application Ser. No. 784,684 filed Sept. 25, 1985 of the same inventor and assignee, and to U.S. Pat. No. 4,663,501 issued May 5, 1987, also of the same inventor and assignee.

3. Description of the Prior Art

In digital signal transmission, pulse patterns may arise which include an unwanted dc component, or whose energy component is particularly high at certain discrete frequencies. In order to avoid such pulse patterns, the digital signal to be transmitted is scrambled with a pseudo-random sequence at the transmitter side by means of modulo-2 addition. Descrambling at the receiver side is undertaken by means of a further modulo-2 addition using the pseudo-random sequence employed at the transmitter side. Normally, synchronization of the pseudo-random generators employed at the transmitter side and the receiver side is necessary, however, it is known to avoid such synchronization by the use of so-called "free-wheeling", multiplicative, self-synchronizing scramblers and descramblers.

Upon further expansion of the digital telecommunications network, transmission devices for signals having an extremely high modulation rate are required between central points of the network. This requires scramblers and descramblers for digital signals having an extremely high clock frequency.

A scrambler for high clock frequency digital signals is described in Siemens Forschungs- und Entwicklungsberichte, Volume 6, No. 1 (1977) at pages 1 through 5. In this known device, the digital signals are scrambled in a plurality of parallel channels with correspondingly lower bit repetition rates, and the resulting signals are combined in multiplexers. The receiver side is analogously constructed, with the parallel descrambling taking place in a plurality of channels following a demultiplexer. In addition to a high circuit outlay, this known device requires synchronizing the multiplexer and demultiplexer with each other.

Scrambling for the individual hierarchy levels in the digital long-distance traffic network in Europe has been standardized by the postal authorities. For example, a scrambler with a scrambler period of 127 bits has been prescribed by the international postal authority in CCITT recommendations under V27 (revised).

SUMMARY OF THE INVENTION

It is an object of the present invention to provide a self-synchronizing scrambler for transmitting digital signals having a high bit repetition rate which does not require multiplex equipment and which has a scrambler period which is selectable independently of the operating speed. It is a further object of the present invention to provide such a scrambler which suppresses selected input bits for short periods.

The above objects are inventively achieved in a self-synchronizing scrambler for scrambling a digital signal having p parallel bits, the scrambler having a like number of scrambler stages to which the parallel bits are respectively supplied in proper sequence. Each scrambler stage has first and second modulo-2 adders, with the output of the first modulo-2 adder being supplied to one input of the second adder, and the other input of the second adder being the parallel bit for the scrambler stage in which the adder is situated. Each scrambler stage further has at least one shift register, having a clock input and a signal input connected to the output of the second modulo-2 adder. The output of the modulo-2 adder is the scrambled output signal for that particular scrambler stage, and the output of the shift register represents that signal delayed by one scrambler period. Certain scrambler stages may also include a second shift register, also supplied with a clock signal, having a signal input connected to the output of the earlier shift register in the same stage, and whose output represents the scrambled signal delayed by two scrambler periods. The number of scrambler stages and the overall scrambler which will contain two shift registers as opposed to one shift register is determined by a formula. If the total number of shift registers in the scrambler is n, the number of scrambler stages each having two clocked shift registers is $n-p$, and the number of following scrambler stages having one clocked shift register is $2p-n$. Using consistent nomenclature, the inputs to the first modulo-2 adder in each stage are respectively connected to the outputs of the one shift register (or the second shift register if the stage has two shift registers) for the scrambler stage immediately preceding the stage in question, and the output of the one or second shift register in the next preceding stage.

In a further embodiment of the invention, momentary suppression of input signals for brief periods can be achieved by connecting a third modulo-2 adder between the original two modulo-2 adders in each scrambler stage. Logic circuitry for supplying one input to this additional modulo-2 adder may also be provided, which logically processes the outputs of other scrambler stages in order to determine the input of the further modulo-2 adder. The other input of the further modulo-2 adder is the output of the first modulo-2 adder.

The scrambler constructed and operated as described above has the advantage of being constructed exclusively of digital components, even in longer scramblers, which significantly facilitates integration of the overall structure. Also, less expensive semiconductor technology, such as CMOS technology, can be utilized. Additionally, the processing speed is reduced to a fraction of the processing speed of conventional scramblers.

DESCRIPTION OF THE DRAWINGS

FIGS. 4a and 4b in combination comprise a schematic circuit diagram of an embodiment of a scrambler constructed in accordance with the principles of the present invention with the ability to suppress input signals for selected short periods of time.

DESCRIPTION OF THE PREFERRED EMBODIMENTS

Figure 1:
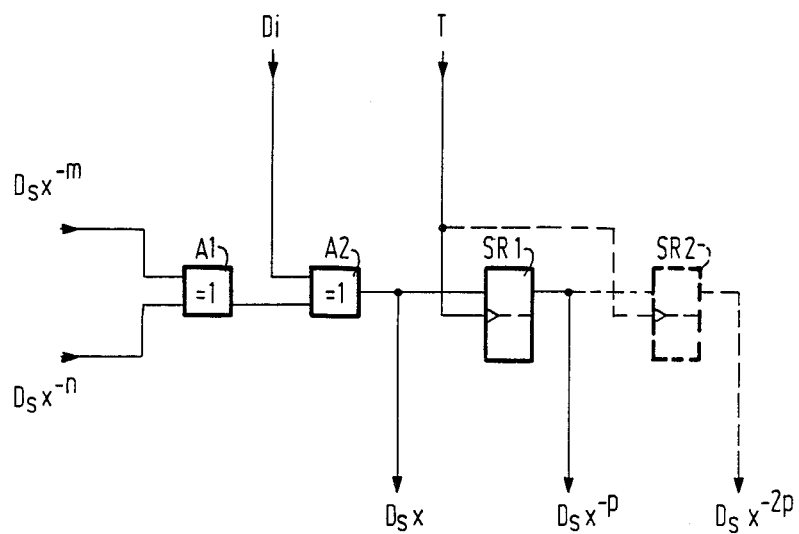
FIG. 1 is a schematic circuit diagram of a scrambler stage constructed in accordance with the principles of the present invention.

A scrambler stage is shown in FIG. 1 for use as part of a multiple stage scrambler. The scrambler stage has a first modulo-2 adder having an output connected to one input of a second modulo-2 adder A2. The output of the adder A2 is supplied to the signal input of a first shift register SR1, which is also supplied with a clock signal T. Under certain conditions, more fully described below the scrambler stage may contain a second shift register SR2, having a signal input to which the output of the first shift register SR1 is supplied, and having a clock input to which the clock pulse signal T is supplied. The scrambler stage shown in FIG. 1 scrambles the $p^{th}$ bit of a digital signal, with the corresponding scrambled bit $D_s x^{-p}$ emitted at the output of the first shift register SR1, and a scrambled bit $D_s x^{-2p}$ is emitted one clock period later at the output of the second shift register SR2. The output signal of the scrambler stage is taken from the output of the second modulo-2 adder. Relative to the signal Di, the first shift register SR1 corresponds to the $p^{th}$ shift register stage of the overall scrambler. An individual scrambler stage contains an input for the output signal $D_s x^{-n}$ of the $n^{th}$ scrambler stage, which is supplied as one input to the first adder A1. As stated above, the output of the adder A1 is supplied as one input to the second adder A2, whose other input is the input signal Di to be scrambled in this stage. The output of the second modulo-2 adder A2 serves as the output terminal for the output signal $D_s x$ for this scrambler stage, and is also connected to the input of the first shift register SR1. The shift registers SR1 and SR2 may be, for example, clocked D-flipflops. The clock frequency for the shift registers thus corresponds to the parallel bit clock, i.e., to the bit clock of the digital signals divided by the number of parallel inputs p of the scrambler. The number of shift register stages of the scrambler is referenced n, and that stage whose output signal is fed back in addition to the signal from the $n^{th}$ stage to the input is referenced as the $m^{th}$ stage, whereby m is less than n by at least one.

In conventional self-synchronizing serial scramblers, the output of the $m^{th}$ stage and the output of the $n^{th}$ are connected by at least one modulo-2 adder to the input of a first shift register stage. In the subject matter of the present application, the scrambler stages are disposed in parallel with one or two shift register stages, whereby each of the p scrambler stages has an available input and the inputs are connected to the parallel outputs of a serial-to-parallel converter as a source for the digital signal, having p parallel bits. For constructing a scrambler comprising n scrambler stages, n−p scrambler stages with two shift registers are employed, and two 2p−n scrambler stages with one shift register stage are used. As seen in the shift direction, the n−p scrambler stages with two shift registers occur first, being followed by the 2p−n scrambler stages having only one shift register. Given a shift direction from left to right in the drawings, the first scrambler stage to the left of the scrambler stage under consideration as output signals $D_s x^{+1}$, $D_s x^{1-p}$, and $D_s x^{1-2p}$, if this is a scrambler stage having two shift registers. The first scrambler stage to the right of the scrambler stage under consideration has output signals $D_s x^{-1}$, $D_s x^{-1-p}$, and $D_s x^{-1-2p}$. Accordingly, the second scrambler stage to the left of the stage under consideration has output signals $D_s x^2$, $D_s x^{2-p}$, and $D_s x^{2-2p}$. The second scrambler stage to the right of the stage under consideration has output signals $D_s x^{-2}$, $D_s x^{-2-p}$, and $D_s x^{-2-2p}$.

Figure 2:
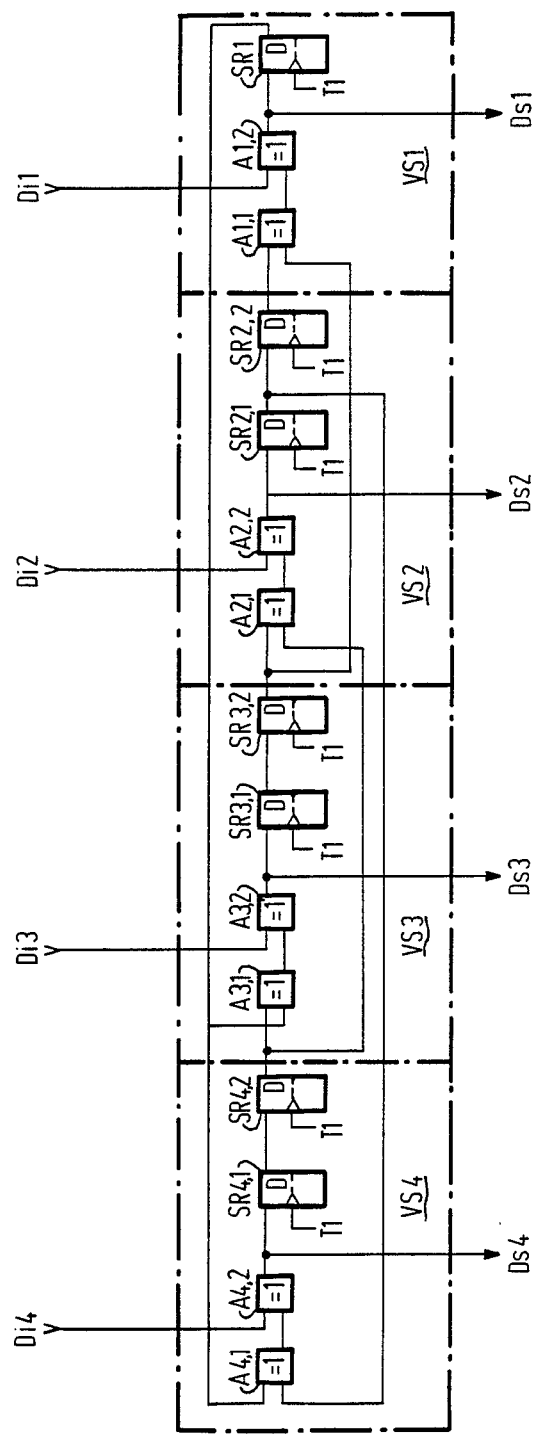
FIG. 2 is a four-stage scrambler constructed in accordance with the principles of the present invention using stages of the type shown in FIG. 1.

The inner connection of four scrambler stages of the type shown in FIG. 1 is illustrated in FIG. 2 to form a scrambler unit having seven shift register stages with feedbacks after the sixth and after the seventh shift registers, and which has four parallel inputs available. As described above, p=4, n=7 and m=6, with the four inputs for signals Di1, Di2, Di3 and Di4 and four outputs Ds1, Ds2, Ds3 and Ds4 being connected in parallel. For a serial transmission, therefore, the scrambler shown in FIG. 2 is preceded by a four stage serial-to-parallel converter (not shown) and is followed by a four-stage parallel-to-serial converter (not shown). Due to the memory characteristics of the converters, the serial-to-parallel conversions and the corresponding parallel-to-serial conversions need not be undertaken bit-synchronized; word synchronization between scramblers at the transmit side and descramblers at the receive side is also not necessary.

The scrambler shown in FIG. 2 has four scrambler stages VS1, VS2, VS3 and VS4, each having an input Di1 . . . Di4 for the parallel receipt of four bits of a digital signal to be scrambled, and outputs Ds1 . . . Ds4. With a total of n=7 shift register stages, a scrambling period of $2^7 - 1 = 127$ bits results. In accordance with the rule described above, n−p=3 scrambler stages having two shift registers occur first in the shift direction, and are followed by 2p−n=one scrambler stage having only one shift register. Consequently, the first scrambler stage VS1 has only one shift register SR1, and the remaining scrambler stages VS2, VS3 and VS4 each contain two shift registers designated at SR21, SR22, SR 31, SR32, SR41 and SR42. In accordance with FIG. 1, these shift registers are connected to the preceding modulo-2 adders and are also connected to a common clock source T1. The other inputs of the first modulo-2 adders A11, A21, and A31 of the first through third scrambler stages are respectively connected to the output of the second shift register stage of the preceding scrambler stage, that is, to the shift register stages SR22, SR32 and SR42. The corresponding input of the first modulo-2 adder A41 of the fourt scrambler stage is connected to the output of the first and only shift register SR1 of the first scrambler stage VS1. The first inputs of the first modulo-2 adders A11 and A21 of the first and second scrambler stages VS1 and VS2 are respectively connected to the outputs of the second shift registers SR32 and SR42 of the second preceding scrambler stages VS3 and VS4. The first input of the modulo-2 adder A11 is connected to the output of the shift register SR32, and the first input of the modulo-2 adder A21 is connected to the output of the shift register SR42. A modification is present in view of the third of fourth scrambler stages VS3 and VS4 because, in view of the corresponding cyclical permutation, the first two inputs of the first modulo-2 adders A31 and A41 are connected to each other, and to the input of the first and only shift register SR1 of the first scrambler stage. The scrambled signal is derived from the input signals from the particular scrambler stages, and the output signals $D_s x^{-6}$ and $D_s x^{-7}$ of the sixth and seventh shift registers to the right of the stage under consideration.

Figure 3:
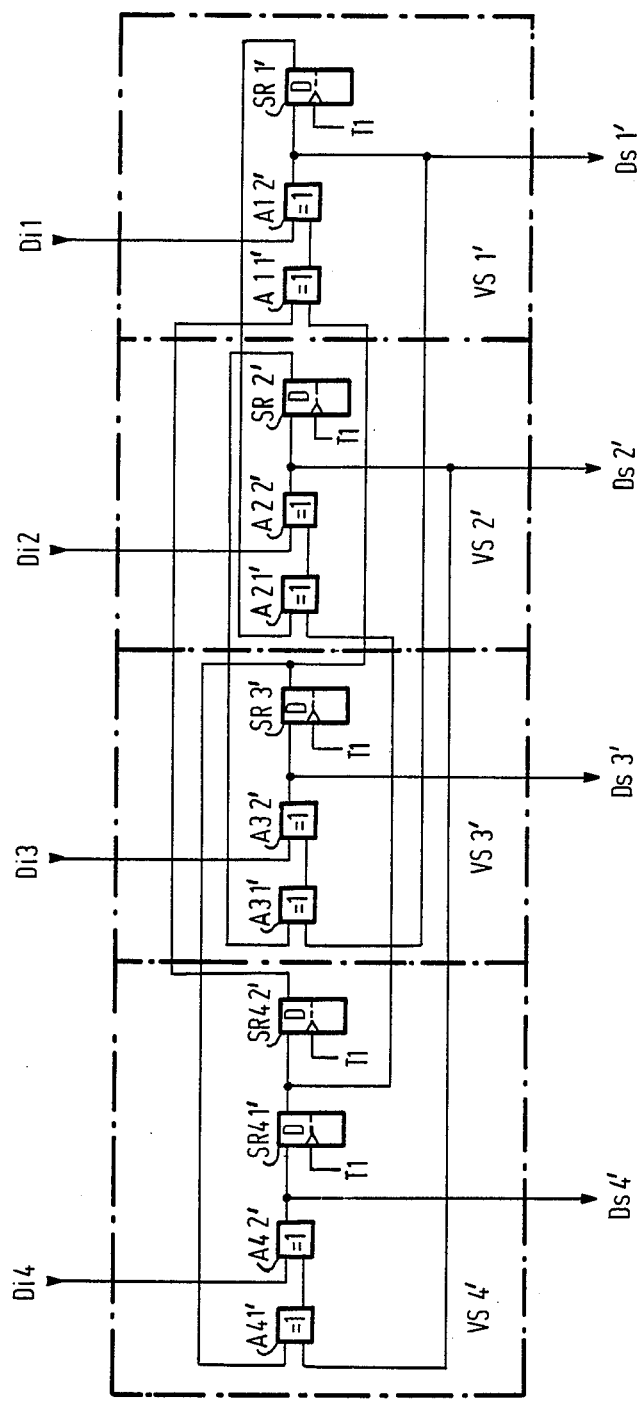
FIG. 3 is a further embodiment of a four-stage scrambler constructed in accordance with the principles of the present invention.

A further scrambler is shown in FIG. 3 having four parallel inputs which, in comparison to the scrambler of FIG. 2, contains five, rather than seven, shift registers and whose scrambler period therefore amounts to 31 bits. Accordingly n=5 and m=2, corresponding to the rule described above, and n−p=1 scrambler stage having two shift registers and 2p−n=3 scrambler stages having only one shift register are provided. The scrambler stages VS1′, VS2′ and VS3′ contain only one shift register, SR1′, SR2′ and SR3′ respectively, and only the fourth scrambler stage VS4′ contains two shift registers SR41′ and SR42′. Feedback from the output of the first shift register SR1′ of the first scrambler stage VS1′ is provided to one input of the first modulo-2 adder A21 of the second scrambler stage VS2′. The output of the shift register SR2′ of this scrambler stage is connected to one input of the first modulo-2 adder A31′ of the third scrambler stage VS3′. The output of the shift register SR3′ of this scrambler stage is connected to the other input of the first modulo-2 adder A11′ of the first scrambler stage, and to one input of the first modulo-2 adder A41′ of the fourth scrambler stage VS4′. The output of the first shift register SR41′ of the fourth scrambler stage VS4′ is connected to the other input of the first modulo-2 adder A21′ of the second scrambler stage VS2′, as well as to the D-input of the second shift register SR42′ of the fourth scrambler stage. The output thereof is connected to one input of the first modulo-2 adder A11′ of the first scrambler stage VS1′. The first output Ds1′ of the first scrambler stage is connected to the further input of the first modulo-2 adder A31′ of the third scrambler stage and the output Ds2′ of the second scrambler stage is connected to the second input of the first modulo-2 adder A41′ of the fourth scrambler stage VS4′. The scrambler shown in FIG. 3 represents an alternative to the scrambler of FIG. 2 which yields a shortened scrambler period given a slightly reduced circuit outlay, with the same plurality of bits processed in parallel.

In conventional scramblers, it is possible, dependent on the input signal pattern, under certain input signal patterns to skip certain states of the scrambler period and periodic output signal sequences of comparatively short duration result. For this reason, scramblers which are used for this purpose contain further shift register stages. In the CCITT recommendations V27 and V27 (revised), for example, a 7-stage scrambler is described which is augmented by five further shift register stages for a total of twelve stages, in order to achieve the above shortened periods. In a scrambler according to recommendation V27 (revised) the content of the stages 8, 9 and 12 is respectively compared to the logical status at the input of the shift register chain. When one of the compared pairs continuously agrees for a short time span of at least 33 bits, then the following input bit is inverted, so that longer-period output signals sequences with bit durations of 1, 2, 3, 4, 6, 8, 9 and 12 bits are suppressed. With the above-described additional circuit outlay, periodic output signal sequences with, for example, bit durations of 5, 7, 10 and 11 bits cannot be suppressed. A suppression of these short periods as well, however, would require even further circuit outlay, so that a use-associated compromise is required in the development of such scramblers. This compromise is also necessary in view of the use of the scramblers at higher transmission rates, because a lengthening of the shift register chains limits such use possibilities at higher transmission rates.

In the parallel scramblers of FIGS. 2 and 3, as well as in other scramblers constructed in accordance with the principles of the present invention using the basic stage shown in FIG. 1, all scrambler stages must be monitored for the appearance of short periods of disruption by a means for short period suppression, if the scrambler is to be compatable with conventional serial scramblers containing shift register stages connected in series.

Figure 4A:
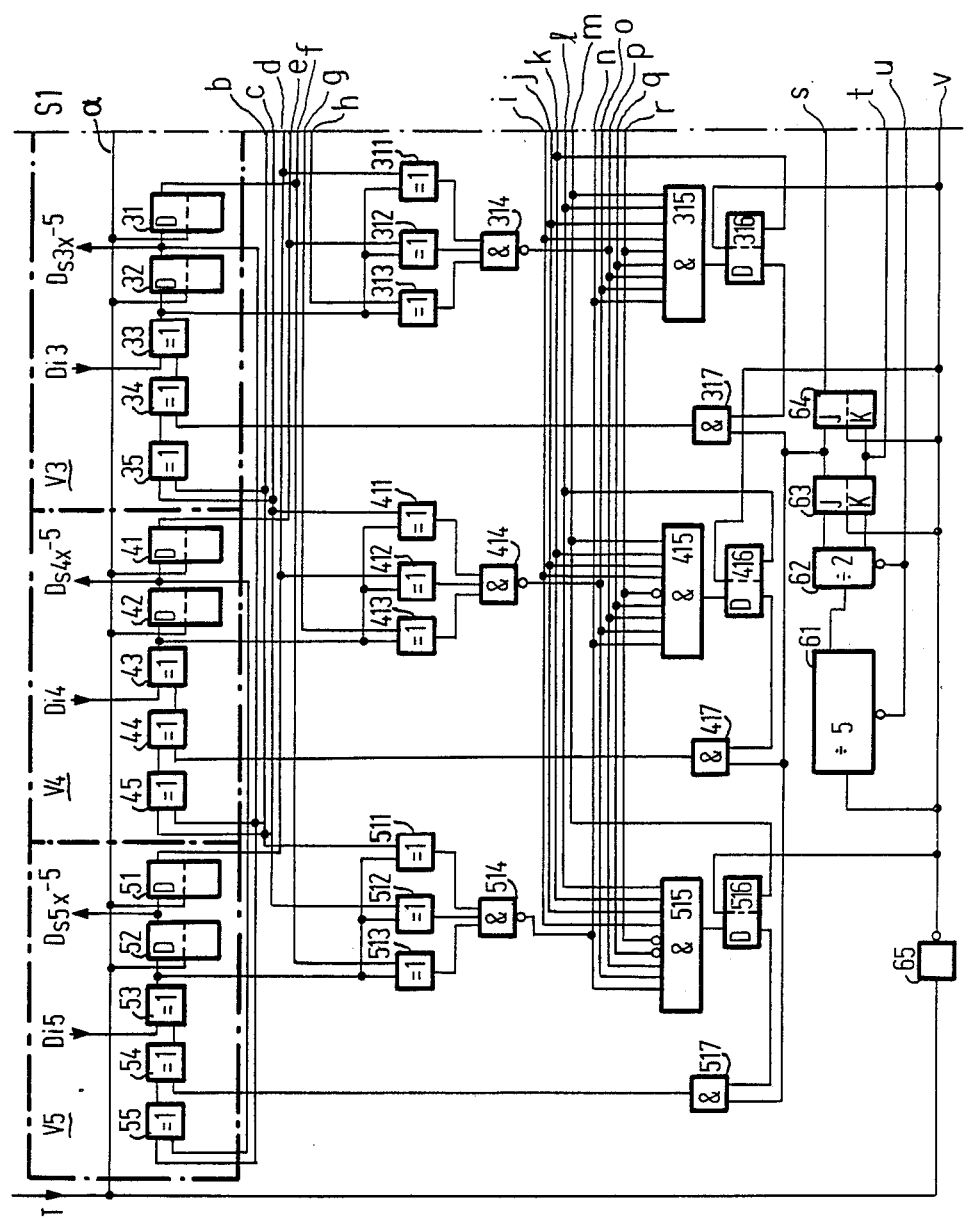

The suppression of undesired short periods of signal fundamentally occurs in accordance with the principles of the present invention by means of a counting device connected to the actual scrambler for coinciding bits which appear in the span of a short period to be suppressed. When a selected number of coinciding bits is exceeded, the counting device emits a pulse which is forwarded to the scrambler stages. The counting device thus forms an essential part of the means for short period suppression. For connection the scrambler stages to the counting device, the scrambler stages are augmented as shown in FIGS. 4a and 4b by a further modulo-2 adder for each stage, respectively designated at 54, 44, 34, 24 and 14. FIGS. 4a and 4b form a single scrambler, with the lines corresponding between each Figure being designated a through v. The further adder is inserted in each stage between the first and second modulo-2 adders (such as A1 and A2 in FIG. 1) such that one input of the third modulo-2 adder is connected to the output of the first modulo-2 adder in the stage, and the second input of the third modulo-2 adder is connected to an allocated output of the means for short period suppression. The output of the third modulo-2 adder is connected to that input of the second modulo-2 adder which was in the previous embodiments connected to the output of the first modulo-2 adder. A scrambler shown in FIG. 4 formed of five such expanded scrambler stages V1, V2, V3, V4 and V5. The dot and dash lines S1 and S2 indicate the division of the circuit between FIGS. 4a and 4b.

The scrambler shown in FIGS. 4a and 4b has five parallel inputs, so that p=5. Further, for generating a shift period of $2^7-1=127$ bits, n=7 shift register stages are employed, whereby the feedback occurs after the m=$6^{th}$ and n=$7^{th}$ stages. In accordance with the rule described above, n−p=2 scrambler stages V5 and V4 having respectively two shift registers 51 and 52, and 41 and 42, are first provided, followed by 2p−n=3 scrambler stages V3, V2 and V1 with one shift register, respectively designated 32, 22 and 12. The further shift registers 31, 21 and 11 additionally contained in the scrambler stages V1, V2 and V3 are not required for the function of the scrambler; those shift registers being a part of the means for short period suppression. This means also includes five groups each containing three modulo-2 adders whose outputs are combined by respective NAND gates 114, 214, 314, 414 and 514. Each of these groups of three is assigned to a scrambler stage. Modulo-2 adders 111, 112 and 113 are allocated to stage V1, adders 211, 212 and 213 are allocated to stage V2, adders 311, 312 and 313 are allocated to stage V3, adders 411, 412 and 413 are allocated to stage V4 and adders 511, 512 and 513 are allocated to stage V5. The first inputs of each of the modulo-2 adders in the groups of three are connected together and are connected to the D-input of the first shift register in the scrambler stage associated therewith.

The second inputs of two of the adders in each of the groups of three are connected to the outputs of the individual shift registers of the scrambler stages such that the bit adjacent to the input of the first shift register of a scrambler stage is compared in each group of three to the eighth, ninth and twelfth stored bits. Because the scrambler stages contain only ten shift registers total, and thus only ten bits can be stored, additional D-flipflops 118 and 218 are provided preceding the second inputs of the first modulo-2 adders 113 and 213 of the first and second groups of three. The flipflops 118 and 218 are connected to the same clock source as the shift registers in the scrambler stages, and their respective D-inputs are connected to the outputs of the second shift registers in the fourth and fifth scrambler stages V4 and V5. Given a quality of the bit at the input of the first shift register stage of a $k^{th}$ scrambler stage with one of the stored bits 8, 9 and 12, a logic one level is present at the output of the corresponding $k^{th}$ NAND gate 114, 214, 314, 414 or 514. The logic one signal is supplied through an inverting input to NAND gate 60, with the NAND gate 60 enabling a divider chain consisting of components 61, 62, 63 and 64 through its inverting output. The divider chain is connected through an inverter 65 to the source for the word clock D of the digital signals, and includes a first divider 61 having a division ratio 2:1 and contains two JK-flipflops.

The means for short period suppression further contains five AND gates 115, 215, 315, 415 and 515 each having five inputs separately connected to the outputs of the NAND gates 114, 214, 314, 414 and 514. Each of the AND gates 115, 215, 315, 415 and 515 further has a second group of four inputs respectively connected to the inverting output of one of the D-flipflops 116, 216, 316, 416 and 516, whose D-inputs are connected to the output of one of the AND gates 115, 215, 315, 415 and 515. The inverting outputs of the D-flipflops are respectively connected to an input of one of the gates to whose gate output the particular D-flipflop is not connected. The non-inverting outputs of the D-flipflops are connected through further respective AND gates 117, 217, 317, 417 and 517 to the second inputs of the third modulo-2 adders of each scrambler stage V1 through V5. The second inputs of AND gates 317, 417 and 517 for the respective third, fourth and fifth scrambler stages are connected to the output of JK-flipflop 63 contained in the divider chain. Flipflop 63 is followed by a further JK-flipflop whose output is connected to the second inputs of the AND gates 117 and 217 associated with the respective first and second scrambler stages.

When the divider chain 61 through 63 is enabled, a bit is inverted through one of the enabling AND gates 117, 217, 317, 417 and 517 and the additional associated third modulo-2 adders in the scrambler stages, and a then-occuring short period is thereby ended. Beginning with the initial recognition of the pulse pattern corresponding to a short period, the periodicity for every following bit is recognized as long as the input pattern is preserved. Thus, after a parallel clock period corresponding at most to five bits, all AND gates 114, 214, 314, 414 and 514 are at the logic one level. The AND gates 115, 215, 315, 415 and 515, in combination with the following D-flipflops 116, 216, 316, 416 and 516 now serve for storing information identifying that bit counted from the input of the first shift register of a scrambler stage a short period was recognized for the first time. Modification of the logic value of a bit at the input of a shift register of a scrambler stage does not occur immediately after the initial recognition of this short period criterion. Instead, the allocation of the outputs of the gates 114, 214, 314, 414 and 514 to the inputs of the AND gates 115, 215, 315, 415 and 515 is such that the thirty-third bit after the initial recognition is inverted. When, in the present case, the recognition first occurs, for example, in that the output of the AND gate 114 allocated to the first scrambler stage changes to the value of a logical one, then after $6 \times 5 = 30$ bit clock pulses, one bit is inverted by the AND gate 315 allocated to the third scrambler stage via the D-flipflop 316 and the AND gate 317 connected thereto in the third modulo-2 adder 34 of the scrambler stage V3.

Instead of being connected to the outputs of the AND gates 114 through 514, the inputs of the AND gates 60 may also be connected to the non-inverting outputs of the D-flipflops 116 through 516. In this case the division ratio of the frequency divider 61 is reduced from 5:1 to 4:1, due to the additional dividing effect of these D-flipflops. Suppression of the undesired pulse peaks on the connecting line between the output of the AND gate 60 and the reset inputs of the divider stages 61 and 62 is thurs achieved.

Although modifications and changes may be suggested by those skilled in the art it is the intention of the inventor to embody within the patent warranted hereon all changes and modificatons as reasonably and properly come within the scope of his contribution to the art.

I claim as my invention:

1. A self-synchronizing scrambler for scrambling a digital signal of p parallel bits having n clocked shift registers for generating a signal having a scrambler period of $2^n - 1$ bits and wherein p is less than n by at least one, said scrambler comprising:

n—p scrambler stages each having at most two clocked shift registers with the output of a first of said two shift registers being connected to the signal input of the second shift register in the scrambler stage;

2p—n scrambler stages following said n—p scrambler stages in the shift direction each having one clocked shift register;

p parallel input lines respectively connected to said scrambler stages with a $p^{th}$ input line connected to a first scrambler stage in the shift direction and the remaining input lines connected to the remaining scrambler stages in sequence;

each scrambler stage further having first and second modulo-2 adders, the second modulo-2 adder having an input connected to the parallel input line for the scrambler stage containing said second modulo-2 adder and having another input connected to the output of the first modulo-2 adder in the same scrambler stage, and having an output at which a scrambled signal for the scrambler stage is tapped, said output also connected to an input of said one or said first shift register in said scrambler stage, each shift register delaying said scrambled signal by one clock pulse;

the first modulo-2 adder in each scrambler stage having an input connected to another scrambler stage for receiving a scrambled digital signal delayed by n clock pulses and another input connected to another scrambler stage for receiving a scrambled digital signal delayed by m clock pulses, where m is less than n by at least one; and means for supplying a clock signal to said shift registers having a frequency equal to the clock frequency of the digital signal to be scrambled divided by p.

2. A self-synchronizing scrambler as claimed in claim 1 further comprising means for suppressing scrambling of said parallel input signals for a selected short period including a third modulo-2 adder in each of said scrambler stages, said third modulo-2 adder having one input connected to the output of said first modulo-2 adder and an output connected to said another input of said second modulo-2 adder, said means for suppressing further having a means for counting the occurrence of coinciding bits from selected ones of said shift registers, said means for counting having respective outputs for supplying a pulse to a second input of said third modulo-2 adder in each scrambler stage when a selected plurality of coinciding bits is exceeded.

3. A self-synchronizing scrambler as claimed in claim 2 having seven clocked shift registers in the respective scrambler stages, and further comprising five additional clocked shift registers, and wherein the outputs of the eighth, ninth and twelfth shift registers in the shift direction are compared for coincident bits by said counter means.

4. A self-synchronizing scrambler as claimed in claim 3 wherein said counter means further includes a group of three additional modulo-2 adders for each of said scrambler stages, each of said further modulo-2 adders in each of said groups having an input connected to the output of the second modulo-2 adder of the scrambler stage associated therewith, and said three further modulo-2 adders in each group having respective further inputs connected to said outputs of said eighth, ninth and twelfth shift registers.

5. A self-synchronizing scrambler as claimed in claim 4 wherein said counting means further comprises for each scrambler stage:
a first AND gate having three inputs connected to the outputs of the group of three further modulo-2 adders associated with the scrambler stage;
a D-flipflop supplied with said clock pulse;
a second AND gate having a plurality of inputs respectively connected to the outputs of each of the first AND gates for each scrambler stage, and a plurality of further inputs respectively connected to a signal output of each D-flipflop except the D-flipflop associated with the scrambler stage to which the second AND gate is allocated;
a third AND gate having an input connected to another output of the D-flipflop associated with the scrambler stage containing the third AND gate, and having an output connected to said further input of the third modulo-2 adder in the associated scrambler stage;
and wherein said counter means further comprises a divider means to which said clock signal is supplied; and
a JK-flipflop combination to which said clock pulse is supplied having inputs connected to said divider means and having outputs respectively connected to a second input of each of said third AND gates associated with said scrambler stages.

6. A self-synchronizing scrambler as claimed in claim 5 wherein said counter means further comprises means for inverting the clock signal supplied to each of said D-flipflops, said divider means and said JK-flipflop combination.

7. A self-synchronizing scrambler for scrambling a digital signal of four parallel bits comprising:
a first scrambler stage having a first modulo-2 adder, a second modulo-2 adder having an input connected to the output of said first modulo-2 adder in said first scrambler stage and another input for receiving a lowest-order one of said four parallel bits, a shift register having an input connected to the output of said second modulo-2 adder in said first scrambler stage;

a second scrambler stage having a first modulo-2 adder having an input connected to the output of the shift register in said first scrambler stage, a second modulo-2 adder having an input connected to the output of said first modulo-2 adder in said second scrambler stage and an input for receiving a next highest order one of said parallel bits, and a shift register having an input connected to the output of said second modulo-2 adder in said second scrambler stage;

a third scrambler stage having a first modulo-2 adder having an input connected to the output of said shift register in said second scrambler stage and an input connected to the output of said second modulo-2 adder in said first scrambler stage, a second modulo-2 adder having an input connected to the output of said first modulo-2 adder in said third scrambler stage and an input for receiving a next-highest order one of said parallel bits, and a shift register having an input connected to the output of said second modulo-2 adder in said third scrambler stage, said shift register in said third scrambler stage having an output connected to an input of said first modulo-2 adder in said first scrambler stage; and a fourth scrambler stage having a first modulo-2 adder having an input connected to the output of said shift register in said third scrambler stage and having another input connected to the output of said second modulo-2 adder in said second scrambler stage, a second modulo-2 adder having an input connected to the output of said first modulo-2 adder in said fourth scrambler stage and another input for receiving a highest order one of said parallel bits, a first shift register having an input connected to the output of said second modulo-2 adder in said fourth scrambler stage, said first shift register in said fourth scrambler stage having an output connected to another input of said first modulo-2 adder in said second scrambler stage, and having a second shift register having an input connected to the output of said first shift register in said fourth scrambler stage and having an output connected to another input of said first modulo-2 adder in said first scrambler stage, each of said scrambler stages having an output signal tapped at the output of the second modulo-2 adder in each stage, and each shift register being supplied with a clock signal having a frequency equal to one-fourth of the frequency of said digital signal, and each shift register delaying the input signal thereof by one clock pulse of said clock signal.

8. A self-synchronizing scrambler for scrambling a digital signal of four parallel bits comprising:
a first scrambler stage having a first modulo-2 adder, a second modulo-2 adder having an input connected to the output of said first modulo-2 adder in said first scrambler stage and having another input for receiving a lowest-order one of said parallel bits, and a shift register having an input connected to the output of said second modulo-2 adder in said first scrambler stage;

a second scrambler stage having a first modulo-2 adder, a second modulo-2 adder having an input connected to the output of said first modulo-2 adder in said second scrambler stage and having another input for receiving a next-highest order one of said parallel bits, a first shift register having an input connected to the output of said second modulo-2 adder in said second scrambler stage, and a second shift register having an input connected to the output of said first shift register in said second scrambler stage, said second shift register in said second scrambler stage having an output connected to an input of said first modulo-2 adder in said first scrambler stage;

a third scrambler stage having a first modulo-2 adder having an input connected to the output of said shift register in said first scrambler stage, a second modulo-2 adder having an input connected to the output of said first modulo-2 adder in said third scrambler stage and having another input for receiving a next-highest order one of said parallel bits, a first shift register having an input connected to the output of said second modulo-2 adder in said third scrambler stage, and a second shift register having an input connected to the output of said first shift register in said third scrambler stage, said second shift register having an output connected to an input of said first modulo-2 adder in said second scrambler stage and to another input of said first modulo-2 adder in said first scrambler stage; and a fourth scrambler stage having a first modulo-2 adder having an input connected to the output of the shift register in said first scrambler stage and having another input connected to the output of the first shift register in the second scrambler stage, a second modulo-2 adder having an input connected to the output of said first modulo-2 adder in said fourth scrambler stage and having another input for receiving a highest order one of said parallel bits, a first shift register having an input connected to the output of the second modulo-2 adder in said fourth scrambler stage, and having a second shift register having an input connected to the output of said first shift register in said fourth scrambler stage and having an output connected to another input of said first modulo-2 adder in said third scrambler stage and to another input of the first modulo-2 adder in the second scrambler stage, each of said scrambler stages having an output signal tapped at the output of the second modulo-2 adder in each stage, and each of said shift registers being supplied with a clock signal having a frequency which is one-fourth of the frequency of said digital signal, each of said shift registers delaying the input signal thereof by one clock pulse of said clock signal.

* * * * *